US009607373B2

(12) United States Patent
Buisseret et al.

(10) Patent No.: US 9,607,373 B2
(45) Date of Patent: Mar. 28, 2017

(54) DETECTION OF ANATOMICAL LANDMARKS

(75) Inventors: Mark Joseph Buisseret, Germantown, TN (US); Mark Ellsworth Nadzadi, Memphis, TN (US); Megan Patrice Rumery, Memphis, TN (US); Aashiish Agnihotri, Memphis, TN (US); Brian W. McKinnon, Bartlett, TN (US)

(73) Assignee: Smith & Nephew, Inc., Memphis, TN (US)

( * ) Notice: Subject to any disclaimer, the term of this patent is extended or adjusted under 35 U.S.C. 154(b) by 441 days.

(21) Appl. No.: 13/814,359

(22) PCT Filed: Aug. 12, 2011

(86) PCT No.: PCT/US2011/047674
§ 371 (c)(1),
(2), (4) Date: Aug. 22, 2013

(87) PCT Pub. No.: WO2012/021861
PCT Pub. Date: Feb. 16, 2012

(65) Prior Publication Data
US 2013/0336553 A1 Dec. 19, 2013

Related U.S. Application Data

(60) Provisional application No. 61/373,630, filed on Aug. 13, 2010.

(51) Int. Cl.
G06T 7/00 (2006.01)
(52) U.S. Cl.
CPC .......... *G06T 7/0012* (2013.01); *G06T 7/0083* (2013.01); *G06T 7/0089* (2013.01);
(Continued)

(58) Field of Classification Search
CPC ........................... G06T 7/0079; G06T 7/0081
See application file for complete search history.

(56) References Cited

U.S. PATENT DOCUMENTS 5,425,368 A 6/1995 Brandt
7,747,047 B2 6/2010 Okerlund et al.
(Continued)

FOREIGN PATENT DOCUMENTS

CN 1550224 A 12/2004

OTHER PUBLICATIONS

Ehrhardt, Jan, Handels, Heinz, Strathmann, Bernd, Malina, Thomas, Plotz, Werner, Poppl, Siegfired. "Atlas-Based Recogntion of Anatomical Structures and Landmarks to Support the Virtual Three-Dimensional Planning of Hip Operations".MICCAI 2003, LNCS 2878, pp. 17-24. 2003.*

(Continued)

Primary Examiner — Kim Vu
Assistant Examiner — Molly Delaney
(74) Attorney, Agent, or Firm — Taft Stettinius & Hollister LLP

(57) ABSTRACT

A method includes accessing image data representing tissue and identifying one or more features of the tissue indicated by the image data. A model is selected for the tissue based on the one or more identified features. The image data is segmented and, using the model, one or more anatomical landmarks of the tissue indicated by the segmented image data are identified.

18 Claims, 9 Drawing Sheets

(52) U.S. Cl.
CPC ............... *G06T 2207/10072* (2013.01); *G06T 2207/20076* (2013.01); *G06T 2207/20128* (2013.01); *G06T 2207/30008* (2013.01)

(56) References Cited

U.S. PATENT DOCUMENTS

| | | | | |
|---|---|---|---|---|
| 8,010,184 | B2* | 8/2011 | Avila et al. | 600/427 |
| 8,582,843 | B2* | 11/2013 | Gregory et al. | 382/128 |
| 8,588,485 | B2* | 11/2013 | Huo et al. | 382/128 |
| 2004/0254439 | A1* | 12/2004 | Fowkes | A61B 8/00 600/407 |
| 2007/0081712 | A1* | 4/2007 | Huang et al. | 382/128 |
| 2010/0098309 | A1* | 4/2010 | Graessner et al. | 382/131 |
| 2010/0272332 | A1* | 10/2010 | Walker et al. | 382/128 |
| 2011/0087465 | A1* | 4/2011 | Mahfouz | 703/1 |
| 2011/0176710 | A1* | 7/2011 | Mattiuzzi et al. | 382/128 |
| 2011/0268338 | A1* | 11/2011 | Collins et al. | 382/131 |

OTHER PUBLICATIONS

Subburaj, K, Ravi, B, Manish, Agarwal. "Automated identification of anatomical landmarks on 3D bone models reconstructed from CT scan images". Computerized Medical Imaging and Graphics. 2009.*

Subburaj, K, Ravi, B, Manish, Agarwal. "Computer-aided methods for assessing lower limb deformities in orthopaedic surgery planning". Computerized Medical Imaging and Graphics. Jun. 2010.*

Druyea, J, Zaim, S, Wolfe, F. "Neural network based automated algorithm to identify joint locations on hand/wristt radiographs for arthritis assessment". Medical Physics 29. 2002.*

Tamez-Pena, Jose G. Barubu-McInnis, Monica. Totterman, Saara. "Knee Cartilage Extraction and Bone-Cartilage Interface Analysis from 3D MRI Data Sets" Medical Imaging 2004: Image Processing.*

Chinese Search Report; Chinese Patent Office; Chinese Application Serial No. 201180049512.1; Mar. 7, 2015; 6 pages.

First Chinese Office Action; Chinese Patent Office; Chinese Application Serial No. 201180049512.1; Mar. 17, 2015; 21 pages.

Chinese Second Office Action; Chinese Patent Office (State Intellectual Property Office, P.R. China); Chinese Patent Application No. 201180049512.1; Jan. 25, 2016; 13 pages.

Chinese Third Office Action; Chinese Patent Office (State Intellectual Property Office, P.R. China); Chinese Patent Application No. 201180049512.1; Oct. 19, 2016; 8 pages.

* cited by examiner

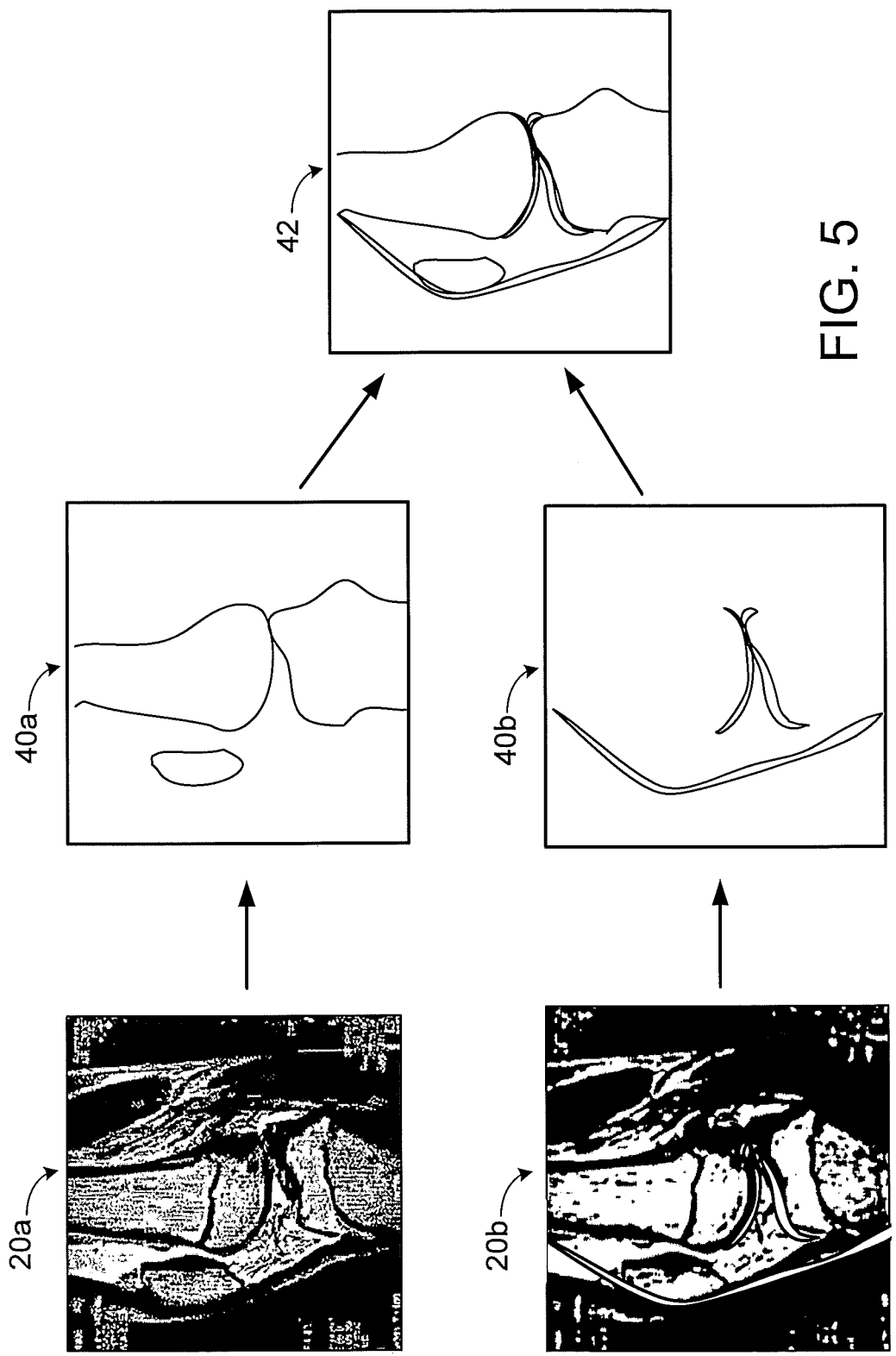

DETECTION OF ANATOMICAL LANDMARKS

CROSS-REFERENCE TO RELATED APPLICATION

This application is a United States National Phase filing of International Application No. PCT/US11/047674 filed on Aug. 12, 2011 which claims priority to and the full benefit of U.S. Provisional Application Ser. No. 61/373,630, filed on Aug. 13, 2010, and titled "Automatic Detection of Anatomical Landmarks", the entire contents of which are incorporated herein by reference.

TECHNICAL FIELD

This disclosure relates to detection of anatomical landmarks.

BACKGROUND

Information about the location of anatomical landmarks can be useful to, for example, diagnose disease and establish surgical alignments. In some instances, anatomical landmarks in medical images are detected manually. Manual detection of anatomical landmarks can be time consuming and is subject to human error and subjectivity.

SUMMARY

In one general aspect, a method includes detecting anatomical landmarks in image data. The imaging data includes one or more images of tissue, and locations corresponding to anatomical features are identified from the one or more images.

In another general aspect, a method includes identifying regions of image data corresponding to different types of tissue. The image data can be acquired by different scans of a patient's anatomy.

In another general aspect, a method of detecting anatomical landmarks includes: accessing image data representing tissue; identifying one or more features of the tissue indicated by the image data; selecting a model for the tissue based on the one or more identified features; segmenting the image data; and identifying, using the model, one or more anatomical landmarks of the tissue indicated by the segmented image data.

Implementations can optionally include one or more of the following features. For example, receiving the image data, identifying one or more features of the tissue, selecting a model, segmenting the image data, and identifying the one or more anatomical landmarks are performed by one or more computing devices. Identifying one or more features of the tissue based on the image data includes performing shape recognition on the image data to identify the tissue and orientation of the tissue. Identifying the one or more features of the tissue based on the image data includes: segmenting the image data to produce initial segmented image data; identifying one or more features of the tissue based on the initial segmented image data; and identifying the one or more features as correlated with a particular medical condition or deformity.

Selecting the model for the tissue based on the one or more identified features includes: determining that the one or more identified features are correlated with a medical condition or deformity, size, age, or sex; and based on determining that the one or more identified features are correlated with the medical condition or deformity, size, age, or sex, selecting a model for tissue representative of the medical condition or deformity, size, age, or sex. Segmenting the image data includes applying one or more thresholds to the image data to define a plurality of boundaries in the image data. Applying one or more thresholds includes applying one or more intensity or contrast thresholds.

The method includes: identifying a region of the segmented image data containing an error in a segmented boundary corresponding to a predetermined anatomical feature and correcting the segmented boundary based on the model to produce corrected segmented image data. Identifying one or more anatomical landmarks in the segmented image data using the model includes identifying one or more anatomical landmarks in the corrected segmented image data using the model. Receiving image data representing tissue includes receiving image data including scan data acquired using different measurement parameters, and segmenting the image data includes identifying tissues of different types using the scan data acquired using different measurement parameters.

Receiving image data including scan data for the tissue acquired using different measurement parameters includes receiving image data acquired using different input pulse sequences or signal timing. The image data is MRI image data including $T_1$-weighted scan data and $T_2$-weighted scan data; and segmenting the image data includes segmenting $T_1$-weighted scan data to identify boundaries corresponding to cortical bone and segmenting $T_2$-weighted scan data to identify boundaries corresponding to cartilage. Selecting the model for the tissue based on the one or more identified features includes selecting a model that includes an artificial neural network trained to identify locations of one or more anatomical landmarks. The artificial neural network is trained to identify locations of one or more anatomical landmarks for a population of patients determined based on a medical condition or deformity, size, age, or sex. Segmenting the image data includes using the artificial neural network to determine boundaries corresponding to one or more tissues.

Identifying one or more anatomical landmarks in the segmented image data using the model includes identifying features corresponding to particular pre-determined anatomical landmarks indicated by the model. Identifying one or more anatomical landmarks in the segmented image data using the model includes identifying one or more global maximum or minimum locations of the segmented image data. The method includes determining that a region of the image data is likely to include a particular anatomical landmark based on the one or more identified features. Identifying one or more anatomical landmarks in the segmented image data using the model includes identifying, as the particular anatomical landmark, a local maximum or local minimum in a region of the segmented image data corresponding to the region. Identifying one or more anatomical landmarks in the segmented image data using the model includes: identifying slices of the image data corresponding to a region of interest; selecting one of the slices that has the highest contrast for the region of interest; and identifying the one or more anatomical landmarks based on the segmented image data corresponding to the selected slice.

In another general aspect, a method of identifying anatomical landmarks includes: accessing first image data for a joint acquired using first measurement parameters and second image data for the joint acquired using second measurement parameters different from the first measurement parameters; identifying a region in the first image data corresponding to a first type of tissue of the joint; identifying a region in the second image data corresponding to a second type of tissue of the joint, the second type of tissue being different from the first type of tissue; generating segmented image data indicating the first region and the second region; and identifying one or more anatomical landmarks of the tissue indicated by the segmented image data.

In another general aspect, a method of identifying anatomical landmarks includes: accessing first image data for a joint acquired using first measurement parameters and second image data for the joint acquired using second measurement parameters different from the first measurement parameters; identifying in the first image data a first region corresponding to a first type of tissue of the joint; identifying in the second image data a second region corresponding to a second type of tissue of the joint different from the first type of tissue; generating segmented image data indicating the first region and the second region; and identifying one or more anatomical landmarks of the tissue indicated by the segmented image data.

Implementations can optionally include one or more of the following features. For example, the first image data and the second image data are acquired using different input pulse sequences or different signal detection timing. The first image data is $T_1$-weighted MRI scan data, the second image data is $T_2$-weighted MRI scan data, and generating segmented image data includes segmenting the first image data to identify boundaries corresponding to cortical bone and segmenting the second image data to identify boundaries corresponding to cartilage.

In another aspect, a method includes: accessing image data acquired by different scans of a patient's anatomy; identifying regions corresponding to different tissue types using the accessed image data from different scans; generating segmented image data indicating the identified regions; and identifying one or more anatomical landmarks indicated by the segmented image data.

Implementations can optionally include one or more of the following features. For example, accessing the image data acquired by different scans of a patient's anatomy includes accessing first image data and second image data, each acquired by different scans. Identifying regions corresponding to different tissue types using image data from different scans includes identifying a region corresponding to a first type of tissue using the first image data and identifying a region corresponding to a second type of tissue using the second image data. The first image data is acquired using x-ray imaging and the second image data is acquired using MRI. The different scan types detect different properties of the anatomy. Accessing image data acquired by different scans of a patient's anatomy includes accessing image data acquired by scans that use different measurement parameters. The scans that use different measurement parameters are MRI scans; and the different measurement parameters include different input pulse sequences or signal timing.

Accessing image data acquired by different scans of a patient's anatomy includes accessing $T_1$-weighted MRI image data and $T_2$-weighted MRI image data. Identifying regions corresponding to different tissue types using image data from different scans includes identifying boundaries of a region corresponding to cortical bone based on the $T_1$-weighted MRI image data and identifying boundaries of a region corresponding to cartilage based on the $T_2$-weighted MRI image data. Generating segmented image data indicating the identified regions includes superimposing the region corresponding to cortical bone and the region corresponding to cartilage.

Accessing image data acquired by different scans of a patient's anatomy includes accessing first tomography data and second tomography data, each including data for a plurality of sectional images representing different slices of the patient's anatomy. Generating the segmented image data indicating the identified regions includes: co-registering the first tomography data and the second tomography data; generating data indicating segmented sectional images for each of the sectional images of the first tomography data and the second tomography data; and generating the segmented image data such that the segmented sectional images of the first tomography and the second tomography data that correspond to substantially the same slice of the patient's anatomy are superimposed. The method includes generating a three-dimensional model of the patient's anatomy based on the segmented image data. Accessing image data acquired by different scans of a patient's anatomy includes accessing image data acquired by different scans of a joint of the patient; and identifying one or more anatomical landmarks indicated by the segmented image data includes one or more landmarks of the joint. The joint is a knee joint.

In another general aspect, a system includes one or more computers and one or more storage devices storing instructions that are operable, when executed by the one or more computers, to cause the one or more computers to perform operations including: accessing image data acquired by different scans of a patient's anatomy; identifying regions corresponding to different tissue types using the accessed image data from different scans; generating segmented image data indicating the identified regions; and identifying one or more anatomical landmarks indicated by the segmented image data.

In another general aspect, a data processing device includes: an image segmentation module configured to access image data acquired by different scans of a patient's anatomy, identify regions corresponding to different tissue types using the accessed image data from different scans, and generate segmented image data indicating the identified regions; and a landmark identification module configured to identify one or more anatomical landmarks indicated by the segmented image data.

The details of one or more implementations are set forth in the accompanying drawings and the description below. Other features will be apparent from the description and drawings, and from the claims.

DESCRIPTION OF DRAWINGS

FIG. 5 is a diagram illustrating segmentation of image data.

Like reference symbols in the various drawings indicate like elements.

DETAILED DESCRIPTION

Figure 1:
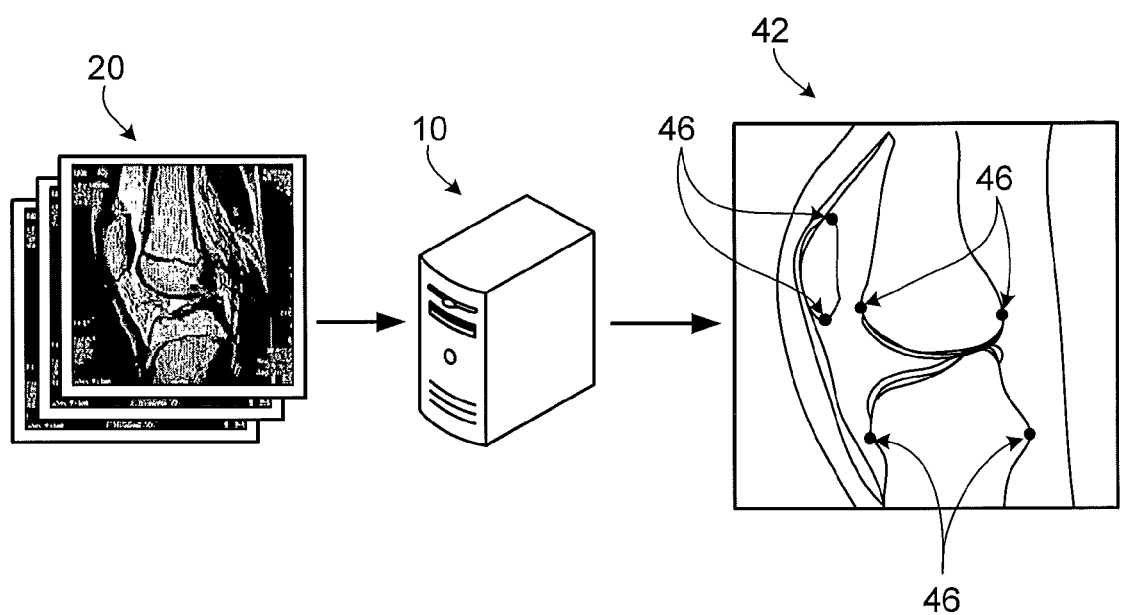
FIG. 1 is a diagram illustrating a computer system for identifying anatomical landmarks.

Referring to FIG. 1, a computer system 10 performs partially automated or fully automated detection of anatomical landmarks 46 in anatomical data. The computer system 10 accesses image data 20 representing a patient's anatomy and identifies features of the image data 20 indicative of, for example, a medical condition of the patient or a population to which the patient belongs. Based on the identified features, the computer system 10 selects a reference model that corresponds to the anatomy of the patient. The reference model indicates, for example, image processing parameters and regions in which anatomical landmarks are likely to be located. Using the reference model, the computer system 10 generates segmented image data 42 that indicates tissue boundaries, and determines the locations of anatomical landmarks 46 relative to the segmented image data 42.

The computer system 10 can use image data from multiple scans of a patient's anatomy to enhance the detection of anatomical landmarks. For example, the computer system 10 can use data from different scans to identify boundaries for different types of tissue. Regions of an image corresponding to bone can be identified using X-ray scan data, and regions corresponding to soft tissue can be identified using MRI scan data. Similarly, data from MRI scans performed using different measurement parameters can be used to identify different tissues. The computer system 10 can combine data from multiple scans to generate composite images that indicate tissues of different types.

Figure 2:
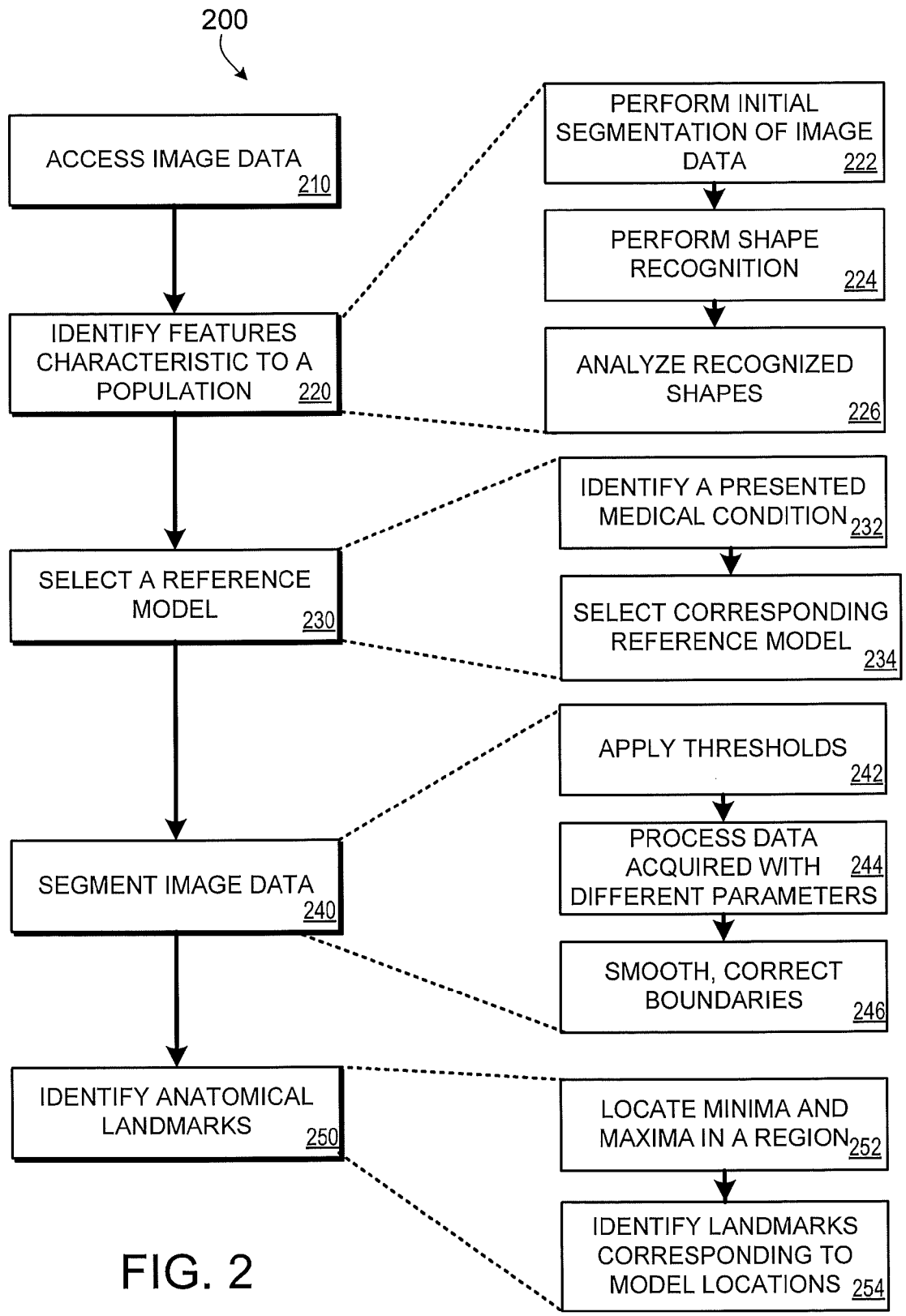
FIG. 2 is a flow diagram illustrating a process for identifying anatomical landmarks.

Referring to FIG. 2, the computer system 10 performs the operations of a process 200 that identifies anatomical landmarks. Various aspects of the process 200 are illustrated in FIGS. 3 to 7.

Beginning the process 200, the computer system 10 accesses the image data 20 representing the patient's anatomy (210), for example, magnetic resonance imaging (MRI) data for the patient's knee. The image data 20 can additionally or alternatively include anatomical data produced by, for example, x-ray imaging, x-ray computed tomography (CT), ultrasound imaging, thermography, photo acoustic imaging, laser scans, computer-assisted investigation, and other techniques. In the illustrated example, the image data 20 includes tomography data indicating images for multiple slices corresponding to different depths in the patient's anatomy. The techniques described herein can be used to detect anatomical landmarks in individual images as well as in sets of multiple images.

The computer system 10 identifies features of the patient's anatomy from the image data 20 (220), for example, features that are characteristic of a population and thus permit the computer system 10 to classify the patient's anatomy. Features identified by the computer system 10 can include, for example, locations or contours of tissues, or characteristics such as dimensions or shapes of tissues. The computer system 10 can also identify features based on intensity levels, histogram characteristics for an image, and the presence or absence of patterns in the image data 20.

Figure 3:
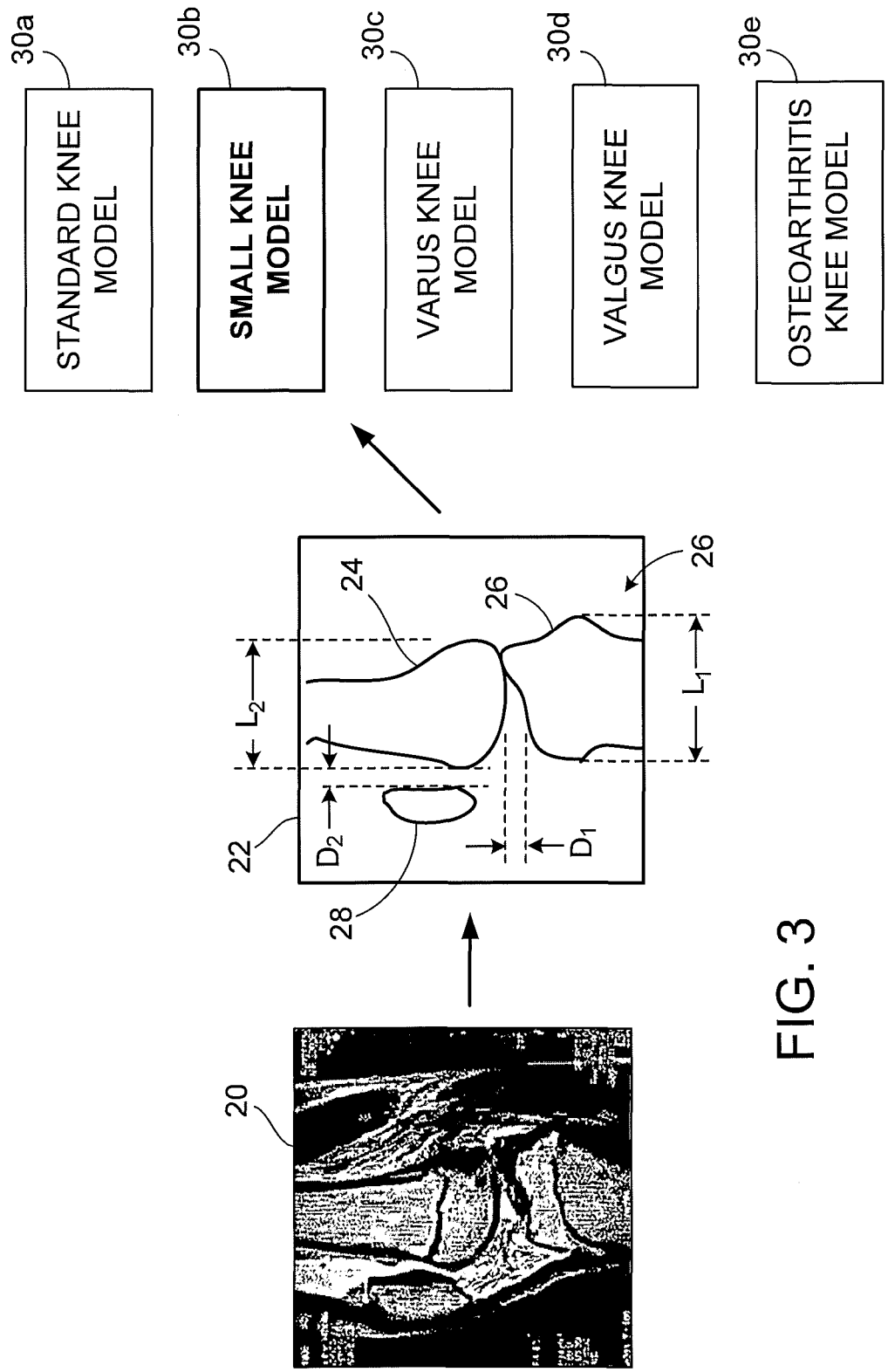
FIG. 3 is a diagram illustrating selection of a reference model.

Referring also to FIG. 3, in some implementations, to identify features from the imaging data 20, the computer system 10 performs a preliminary image segmentation of the image data 20 (222), for example, assigning boundaries to tissues represented by the image data 20. The computer system 10 produces segmented image data 22 that indicates the contours of, for example, cortical bone. The computer system 10 performs shape recognition (224) on the segmented image data 22, identifying contours corresponding to, for example, a femur 24, a tibia 26, and a patella 28. Shape recognition can include comparing representative bone shapes to the contours of the segmented image data 22, and selecting representative bone shapes that best match the contours of the segmented image data 22. The general orientation of the patient's anatomy, for example, an orientation of a medial-lateral or anterior-posterior axis, can be indicated by metadata included in the imaging data 20, or can be determined through shape recognition.

The computer system 10 analyzes the recognized shapes (226), for example, identifying dimensions, proportions, and relative positions of the identified bone contours. In the illustrated example, the computer system 10 identifies, for example, a largest anterior-posterior length, $L_1$, of the tibia 26 and a largest anterior-posterior length, $L_2$, of the femur 24. The computer system 10 also identifies, for example, a distance, $D_1$, between the femur 24 and the tibia 26, and a distance, $D_2$, between the femur 24 and the patella 28. The image data 20 can indicate a size scale for the features in the images, which the computer system 10 uses to measure dimensions. If a size scale is unavailable, ratios and proportions can be calculated rather than dimensions. Similarly, other measurements can be made for analysis of other sections or views of a knee joint.

The computer system 10 also compares the recognized contours of the segmented imaging data to characteristic shapes for the bones 24, 26, 28. Variance from the characteristic shapes and expected surface contours can indicate, for example, the presence of bone growths, such as osteophytes, or the absence of bone due to trauma or excessive wear. In some implementations, features of cartilage or other tissues can also be examined, in addition to, or instead of, features corresponding to bone.

The computer system 10 selects a reference model based on the identified features (230). The reference model defines image processing parameters and a template for detecting anatomical landmarks. The computer system 10 stores multiple reference models 30a-30e, each corresponding to a different population of patients. Patient populations can be distinguished by, for example, age, sex, size, or medical condition or deformity. For example, the standard knee model 30a includes a template that represents generalized features of knee joints of patients having average size and health. The small knee model 30a includes a template that represents knee anatomy for smaller than average knees. The varus knee model 30c, the valgus knee model 30d, and the osteoarthritis knee model 30e each include a template that represents characteristic features of knees presenting with particular medical conditions.

Each reference model 30a-30e includes a set of attributes describing the corresponding population, for example, attributes correlated with a size, age, sex, or medical condition or deformity. When the image data 20 for the patient exhibits the characteristic attributes of a population, the patient is likely a member of the population, and thus the corresponding reference model 30a-30e can accurately aid detection of anatomical landmarks in the imaging data 20. The computing system 10 compares identified features to the population attributes for the various models 30a-30e to select the reference model that most closely matches the characteristics of the image data 20.

Characteristic attributes for the small knee model 30b include, for example, bone size and joint spacing within predetermined ranges. When the lengths, $L_1$, $L_2$, and distances, $D_1$, $D_2$, are within the ranges or thresholds indicated by the small knee model 30b, the computer system 10 selects the small knee model 30b as the reference model for the image data 20. In the example, the computer system 10 determines that identified features most closely match the attributes of the small knee model 30b and selects the small knee model 30b.

In some implementations, the computer system 10 identifies a medical condition or abnormality of the patient (232). When a medical condition is identified, the computer system selects a reference model 30a-30e corresponding to the identified medical condition (234). As an example, the computer system 10 can determine that an angle between the femur 24 and the tibia 26 indicates a varus deformity or valgus deformity, and thus the varus knee model 30c or valgus knee model 30d can be selected. As another example, the osteoarthritis knee model 30e can be selected when, for example, the distances, $D_1$, $D_2$, indicate lower than average joint spacing, or when the presence of osteophytes or other irregular bone contours are detected.

Figure 4:
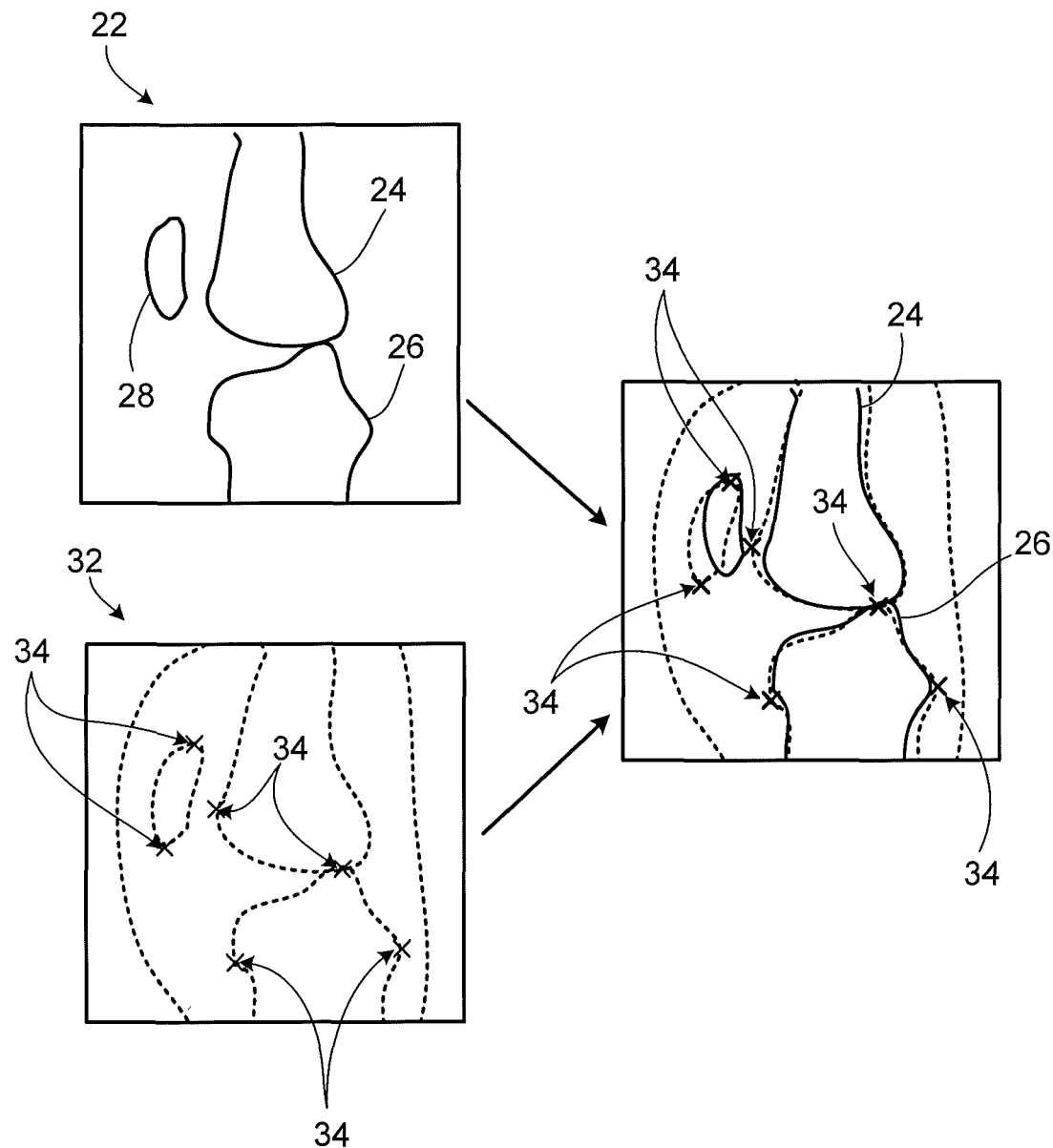
FIG. 4 is a diagram illustrating registration of a template to image data.

Referring to FIG. 4, each model 30a-30e includes a template, for example, data indicating a shape or image representing common anatomical features of the corresponding population. The model 30b, for example, includes a template 32 that indicates locations of reference landmarks 34 relative to the template 32. As described further below, the locations of the reference landmarks 34 are used to determine locations of corresponding anatomical landmarks 46 based on the image data 20.

The template 32 can include one or more two-dimensional images corresponding to a similar anatomical view as represented by the imaging data 20. Alternatively, the template 32 can include a three-dimensional representation of a patient's anatomy. Two-dimensional sections or slices of the template 32 can be generated for comparison with two-dimensional images of the imaging data 20.

The computer system 10 registers the template 32 to the image data 20 by orienting the template 32 in the coordinate reference system of the image data 20. The computer system 10 aligns the contours of the template 32 with the contours of the initially segmented image data 22, which shares the same coordinate reference system as the image data 20. The template 32 can be translated, rotated, scaled, or otherwise manipulated to align with the contours of the segmented image data 22. In some implementations, the computer system 10 uses regression techniques, such as least squares data fitting techniques, to register the segmented image data 22 and the template 32.

The model 30b also indicates image processing parameters, such as segmentation thresholds and other constraints. The image processing parameters can be empirically determined through examination of image data for multiple members of the population corresponding to the model 30b. Thresholds and other constraints can be set at levels determined to be effective for the particular population associated with the model.

After the model 30b is selected, the computer system 10 performs image segmentation of the image data 20 (240), for example, locating boundaries of regions corresponding to different tissues. Segmentation can also include assigning labels to particular regions or contours, for example, specifying a region as corresponding to bone or cartilage. When the segmented image data 22 by an initial segmentation operation, segmentation using the model 30b can increase the accuracy of the segmented contours because the model 30b includes image processing parameters and a template 32 specific to a population.

The computer system 10 applies one or more intensity thresholds (242) to the image data 20, for example, reducing a grayscale image to a black and white image. Contiguous regions of pixels with intensities above the threshold can represent a particular tissue type, while pixels below a threshold intensity can be ignored. Multiple intensity thresholds can be applied to an image to identify pixels in multiple intensity ranges. Pixels in a one intensity range correspond to a one tissue type, and pixels in a different intensity range correspond to a different tissue type. Threshold levels can be adjusted for a particular image based on, for example, an average intensity of the image or features determined from an intensity histogram of the image.

The selected model 30b can define the values of intensity thresholds determined to be effective for processing image data for a particular medical condition or population. The model 30b can also define different thresholds for different regions of an image, or different thresholds for different images in a series of images. Because the image data 20 is registered to the template 32, image processing parameters associated with different regions of the template 32 can be applied to corresponding regions of the image data 20.

The computer system 10 uses multiple techniques to produce segmented image data based on the image data 20. For example, the computer system 10 also uses edge detection techniques to identify tissue boundaries. For example, the computer system 10 can compute the magnitude of intensity gradients for the image data. Edges can be defined at locations exceeding a gradient threshold, or at locations corresponding to maxima and minima of the gradient magnitude.

The computer system 10 can additionally or alternatively use image segmentation techniques such as clustering, region-growing, quadtree segmentation, graph partitioning, watershed transformation, and histogram-based techniques. The computer system 10 can identify regions that include similar patterns or textures using, for example, Fourier analysis or by identifying local regions that exhibit similar histogram characteristics.

Referring to FIGS. 2 and 5, image segmentation operations can include processing data acquired with different data acquisition parameters (244). The computer system 10 can access image data acquired by different scans of a patient's anatomy. The computer system 10 can identify regions corresponding to different tissue types using the accessed image data from different scans. For example, the computer system 10 can identify a region corresponding to a first type of tissue using first image data, and can identify a region corresponding to a second type of tissue using the second image data.

In some implementations, the computer system 10 accesses data for scans that detect different properties of the patient's anatomy. For example, the computer system 10 can access data acquired by x-ray imaging, for example, CT scans or individual x-ray scans, and data acquired by MRI. The computer system 10 can identify regions corresponding to bone using the x-ray imaging data, and can identify regions corresponding to cartilage or other tissues using the MRI data.

In some implementations, the computer system 10 accesses multiple sets of MRI image data, which are acquired by scans that use different measurement parameters. For MRI scans, acquisition parameters include, for example, an input pulse sequence, an echo time, $T_E$, and a repetition time, $T_R$. Variations of these parameters can change the types of tissues detected and the contrast between the tissues. Thus regions and boundaries corresponding to different tissue types can be determined using image data obtained using different measurement parameters. Scans that measure different physical properties, for example, MRI scans and x-ray scans, can also be used to identify different tissues.

The imaging data 20 includes, for example, $T_1$-weighted MRI image data 20a and $T_2$-weighted image data 20b, which are obtained using different measurement parameters. Water-containing tissues can appear lighter in $T_1$-weighted images than in $T_2$-weighed images, resulting in a variation in contrast for certain tissues. Other MRI scan data can be used, including data acquired with, for example, $T^*_2$-weighted scans, spin density or proton density weighted scans, or fluid attenuated inversion recovery (FLAIR) scans.

The computer system 10 segments the $T_1$-weighted image data 20a to identify boundaries corresponding to cortical bone, which are indicated in segmented data 40a. The computer system 10 segments the $T_2$-weighed image data 20b to identify boundaries corresponding to cartilage, tendons, and ligaments, which are indicated in segmented data 40b.

After the imaging data 20a, 20b is segmented, the computer system 10 registers the segmented data 40a, 40b to a common coordinate reference system. The contours of the segmented data 40a, 40b are superimposed, producing composite segmented image data 42 that indicates the contours of multiple tissue types. When the orientation of the patient remains consistent for multiple scans, the coordinate system used by the MRI scanner to acquire the imaging data 20a, 20b can be used to align the segmented imaging data 40a, 40b. As an alternative, shape recognition and data fitting can be used to register the segmented imaging data 40a, 40b, or to separately register the segmented imaging data 40a, 40b to the template 32.

To combine multiple sets of tomography data, the computer system 10 can superimpose sectional images that correspond to substantially the same portions of the patient's anatomy. For example, the computer system 10 can co-register two sets of tomography data to a common reference system. The computer system 10 can then perform image segmentation for each sectional image for both sets of tomography data. The computer system 10 superimposes segmented sectional images that substantially correspond to the same slice of the patient's anatomy. For example, the segmented sectional image for the first medial slice of one set of tomography data can be superimposed with the segmented sectional image for the first medial slice of another set of tomography data. When the spacing between slices or orientations of the slices is not the same for two sets of tomography data, the computer system 10 can interpolate contours that align with a segmented sectional image of the other set of tomography data.

In some implementations, as discussed below, the computer system 10 can generate a digital three-dimensional model from segmented tomography data. The three-dimensional model can indicate regions corresponding to different tissue types, for example, regions corresponding to bone and cartilage, which can be identified using image data acquired by different scans.

During each of the image segmentation operations, the computer system 10 can apply constraints indicated by the model 30b. For example, the model 30b can indicate statistical confidence levels at which contours corresponding to particular tissues are likely to occur. When segmentation operations place contours in a statistically unlikely area, for example, in a region having a confidence level below a threshold, the computer system 10 can alter the boundary, cause the boundary to be recalculated using different parameters, or recalculate the registration of the imaging data 20 with the template 32.

Alternatively, the computer system 10 can mark the boundary for human review or correction.

The computer system 10 also corrects and smooths the contours of the segmented data 42 (246). For example, the computer system 10 identifies disjointed segments corresponding to a contour of the template 32 and connects the segments to form a continuous contour. The model 30b can define processing rules requiring, for example, that particular contours to be continuous, that the slope of contours in particular regions be within a defined range, or that a particular region be bounded. The processing rules can also ensure accuracy of features indicating medical conditions of interest. For example, the osteoarthritis model 30e can limit smoothing of regions corresponding to joint articular surfaces, improving the probability that irregular contours corresponding to osteophytes and other deformities are not improperly altered.

The computer system 10 can iteratively refine the segmented contours and the registration of the segmented contours with the template 32. For example, the computer system 10 can first refine the contours of the segmented imaging data 42 based on the contours of the template 32. The computer system 10 can then update the registration of the segmented data 42 to the template 32, using the refined contours. The contours of the segmented image data 42 can then be refined again using the updated registration, and so on.

Figure 6A:
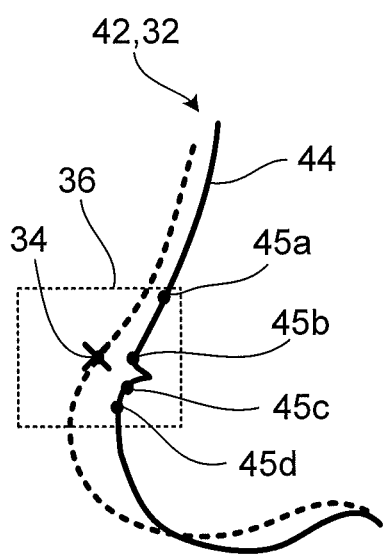
FIGS. 6A, 6B and 7 are diagrams illustrating techniques for identifying anatomical landmarks.
Figure 6B:
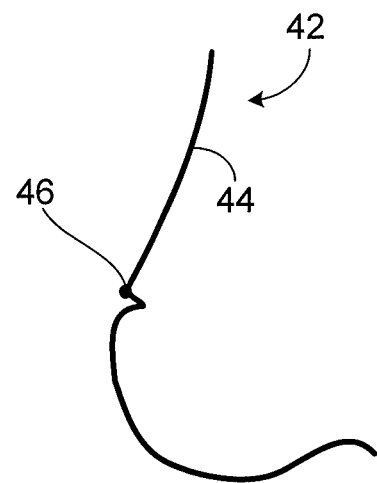

Referring to FIGS. 2, 6A, and 6B, the computer system 10 identifies anatomical landmarks 46 in the composite segmented image data 42 (250). The model 30b indicates regions of interest 36 in which anatomical landmarks are likely to occur. For example, when the segmented image data 42 and the template 32 are co-registered, the anatomical landmarks 46 of the segmented image data 42 are likely to be located within a threshold distance of the corresponding reference landmarks 34 of the template 32. The model 30b defines the shape and size of regions of interest 36 for each anatomical landmark to be identified.

To identify an anatomical landmark 46, the computer system 10 identifies a contour 44 corresponding to the tissue of interest, for example, the femur. Within the region of interest 36 for a particular reference landmark 34, the computer system 10 identifies local minima and maxima on the contour 44 (252). Maximum points, minimum points, and inflection points within the region of interest 34 are selected as candidate landmarks 45a-45d. The computer system 10 calculates a distance between each candidate landmark 45a-45d and the reference landmark 34. The computer system 10 then designates the candidate landmark 45b closest to the reference landmark 34 as an anatomical landmark 46 corresponding to the reference landmark 34 (254).

In some implementations, the model 30b indicates statistical confidence levels within the region of interest 36, indicating likely variances from the position of the reference landmark 34. Rather than selecting the anatomical landmark 46 based on calculated distances, the computer system 10 can identify a statistical confidence levels corresponding to the location of each candidate landmark 45a-45d, as indicated by the model 30b, and can select the candidate landmark 45b with the highest confidence level as the anatomical landmark 46.

In addition, the model 30b can indicate whether a particular anatomical landmark is located at a maximum point or minimum point, or has a particular spatial relationship relative to maximum or minimum points in the region of interest 36. The computer system 10 can filter the candidate landmarks 45a-45d accordingly. The model 30b can also define anatomical landmark in other ways, for example, as (i) an absolute maximum or absolute minimum for an image, (ii) an extreme value in a particular direction, such as the most anterior point or the most inferior point, or (iii) as a point intersecting a reference axis or plane.

The anatomical landmarks detected for imaging data 20 of a knee can include locations of, for example, a medial epicondyle, a lateral epicondyle, a tibial sulcus, a tibial spine, and an adductor tubercle. Anatomical landmarks detected can also include, for example, a posterior point on each condyle, which can permit a posterior condylar axis to be determined. Detected anatomical landmarks can be locations, orientations, points, segments, regions, or surfaces. For example, the computer system 10 can also identify the orientation of an anterior-posterior axis, a posterior condylar axis, or an epicondylar axis as a landmark.

The imaging data 20 can include tomography data that represents the patient's anatomy at different depths or levels. Using the process 200 described above, the computer system 10 generates segmented image data for each slice or component image of the topography data. The computer system 10 can generate a three-dimensional model, such as a CAD model, based on the segmented image data for each slice, and indicates the location of identified anatomical landmarks relative to the three dimensional model.

Figure 7:
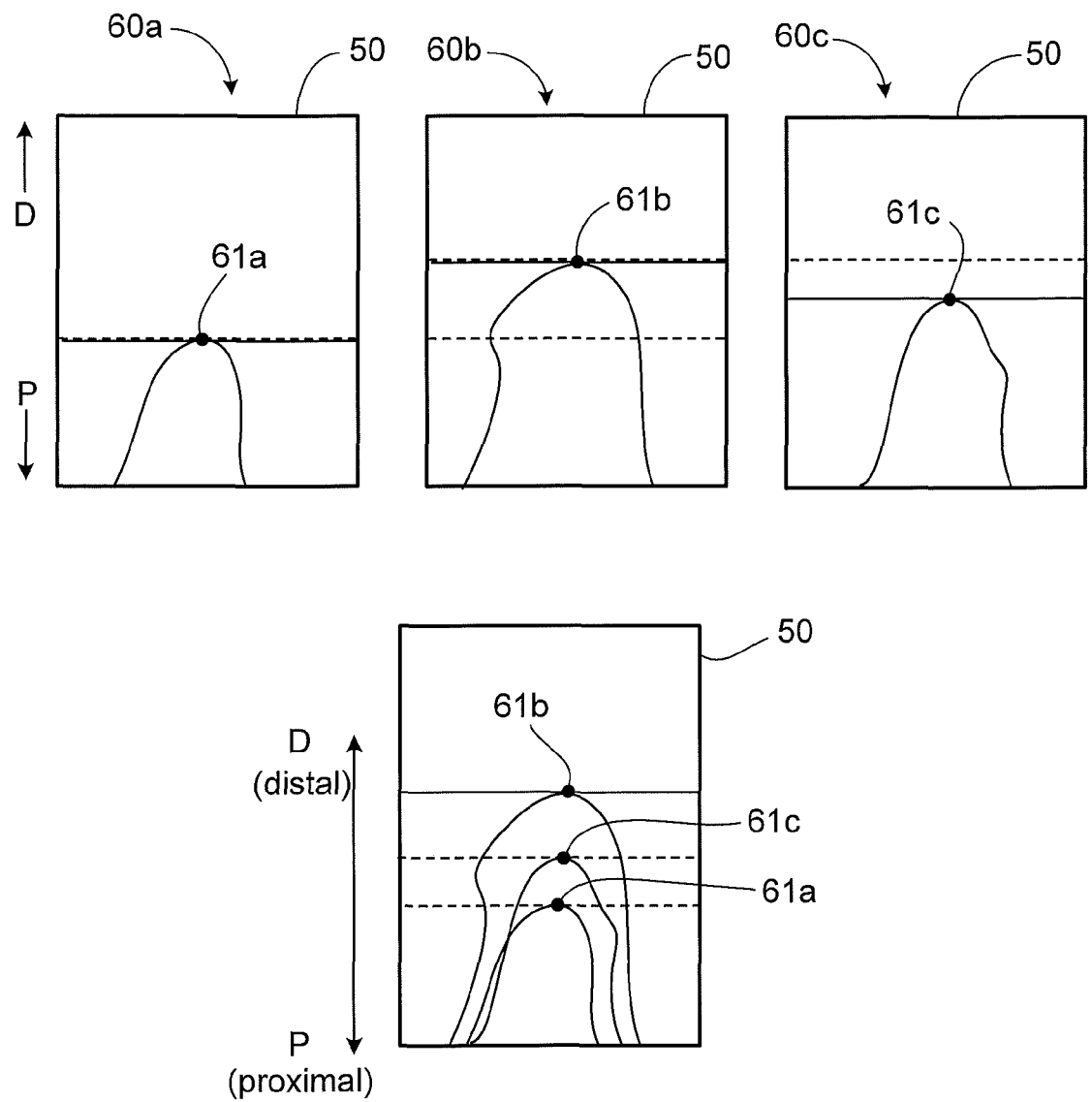

Referring to FIG. 7, the computer system 10 can identify anatomical landmarks using multiple slices of topography data. The model 30b can indicate, for example, that the landmark is the most distal point within a region of interest 50, and that the region of interest 50 is a three-dimensional region. The region of interest 50 can span multiple slices of topography data. To identify the landmark, the computer system 10 identifies segmented images 60a-60c for different slices within the region of interest 50. The computer system 10 identifies the most distal point 61a-61c for the contours of each segmented image 60a-60c, and determines that the point 61b of the image 60b is the most distal, and therefore represents the location of the landmark.

When a region of interest 50 spans multiple slices of tomography data, the computer system 10 can identify the best candidate landmark in each slice, and can then select among the candidate landmarks to designate the landmark. The computer system 10 can also examine the contrast of the different slices, for example, by examining the original imaging data 20. The computer system 10 can select the slice exhibiting the best contrast or image quality in the region of interest, and determine the anatomical landmark based on the segmented contours for that slice.

As an alternative, the computer system 10 can identify landmarks on a three-dimensional model rather than examine individual slices of tomography data to identify a landmark in a three-dimensional region. The computer system 10 can generate the three-dimensional model based on the segmented image data 42 and can identify landmarks on the surface of the model.

After identifying one or more anatomical landmarks 46, the computer system 10 can repeat portions of the process 200 to refine the registration of the template 32 to the imaging data 20, improve segmentation accuracy, and identify additional landmarks. For example, the locations of identified landmarks can be aligned with locations of corresponding reference landmarks 34 to improve the accuracy of image registration. The adjusted registration can result in additional anatomical landmarks being located in a region of interest, and thus becoming detectable by the computer system 10.

Figure 8:
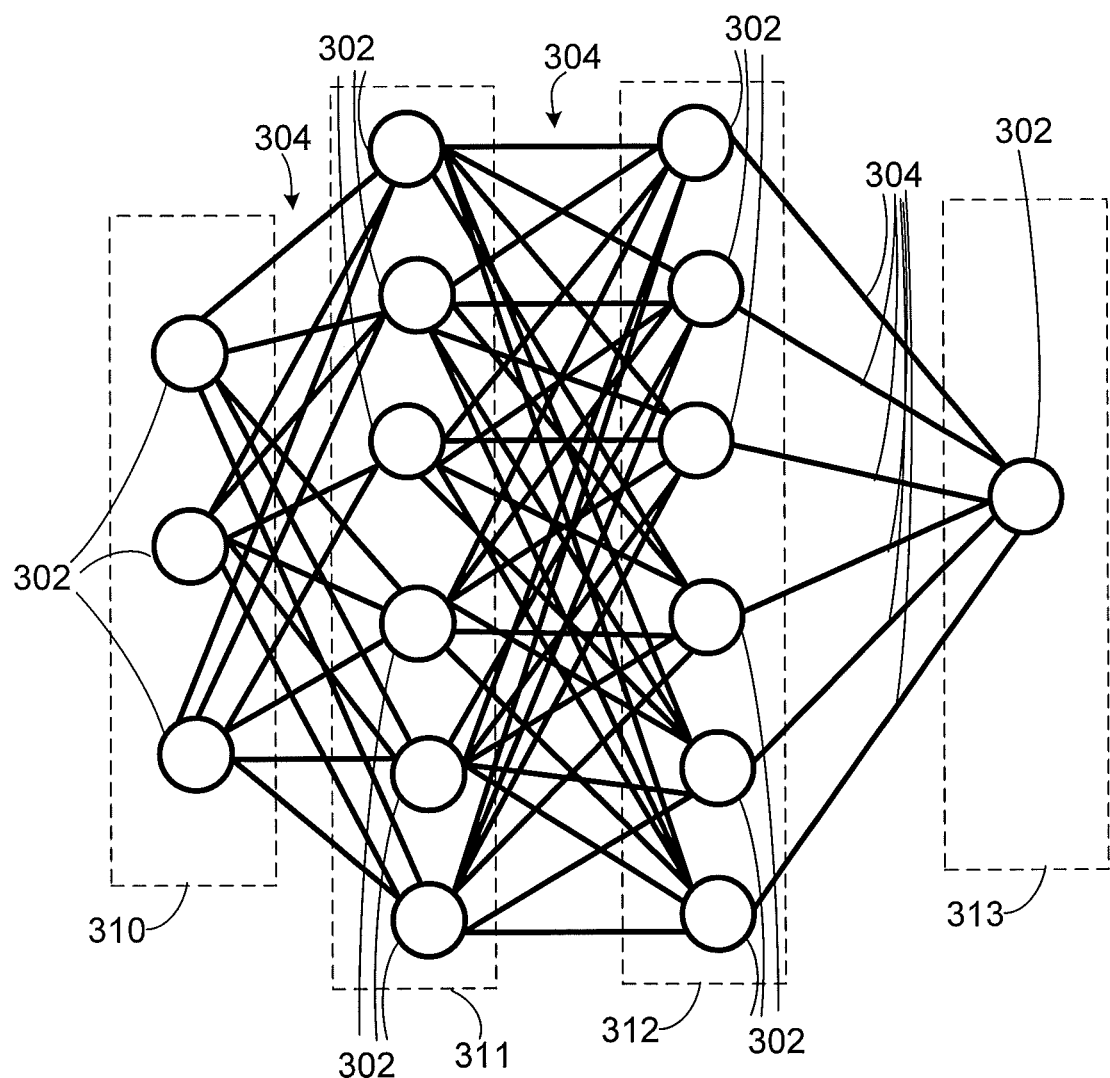
FIG. 8 is a diagram of an artificial neural network.

Referring to FIG. 8, the computer system 10 can use one or more artificial neural networks (ANNs) to determine the locations of anatomical landmarks 46. For example, each reference model 30a-30e can include an ANN trained to detect anatomical landmarks in image data. The ANN for each reference model 30a-30e can additionally be trained to perform image segmentation, for example, to define contours corresponding to one or more tissues.

An example of an ANN 300 includes multiple interconnected neurons or nodes 302. The nodes 302 are organized into multiple layers 310, 311, 312, 313, and information is passed through connections 304 between the nodes 302. In the illustrated example, information propagates through the connections 304 from left to right. Input is received at the nodes 302 of the input layer 310. Through the connections 304, the input is received and manipulated by the nodes 302 of one or more processing layers 311, 312. One or more outputs are produced at the output layer 313.

Each node 302 receives one or more input values through its connections 304, and produces an output that is transmitted to one or more other nodes 302 of the subsequent layer 310, 311, 312, 313. Each connection 304 is assigned a weighting value, which is determined during the training process.

Each node 302 outputs a value to the next layer 310, 311, 312, 313 based on the input received through its connections 304 and the weighting values of those connections 304. The output value for a node 302 can be, for example, a sum of the weighing value for each input connection 304 multiplied by its corresponding input value, as indicated in Equation 1, below:

$$\text{Output} = A_1 B_1 + A_2 B_2 + A_3 B_3 + \ldots + A_i B_i \qquad \text{Equation 1}$$

where $A_1 \ldots A_i$ are weighing values associated with input connections $1 \ldots i$, and $B_1 \ldots B_i$; are input values received through the connections $1 \ldots i$.

For identification of anatomical landmarks, inputs to the ANN 300 can include image data, for example, MRI image data, and patient information, for example, age, sex, ethnic origin, weight, and height. Outputs of the ANN 300 can include, for example, segmented image data for each sectional image of an MRI image data and locations of one or more anatomical landmarks. The segmented image data output by the ANN 300 can be expressed as coefficients of one or more polynomial functions that define curvature of tissue boundaries in the segmented data.

The ANN 300 can be trained by adjusting the weighing values of the connections 304 based on actual data for multiple patients. The ANN 300 can be trained for anatomical landmark detection using any appropriate machine learning algorithm, for example, for example, a supervised learning algorithm. Using imaging data for members of a particular population, the ANN 300 can be trained to accurately locate anatomical landmarks and tissue boundaries for that population. As an alternative, an ANN may be trained to perform image segmentation or detect anatomical landmarks for patients generally, and not for a particular population or class of patients.

To determine the weighting factors for the connections 304, default weighting parameters can initially be assigned. Training data for a first patient, for example, MRI image data for the first patient's knee and patient information for the first patient, is input to the ANN 300, which outputs data indicating calculated locations of one or more landmarks and calculated tissue boundaries. The computer 10 determines a difference between the calculated outputs and actual locations and tissue boundaries, and uses the difference to adjust the weighting values. The training data for the first patient can be input repeatedly to the ANN 300, and the weighting values can be adjusted repeatedly until the correct outputs are produced. The same process can be repeated with training data for a second patient, third patient, and so on until the ANN 300 produces accurate outputs for a large set of patients. In some implementations, the computer system 10 performs one or more steps of the training process, for example, by inputting sets of training data, comparing outputs of the ANN 300 to actual data, adjusting the weighting values, and determining whether an adequate level of accuracy has been reached.

The ANN 300 can receive input about multiple sectional images corresponding to different tomography slices of a patient's anatomy. The inputs to the ANN 300 can include, for example, the relative positions of each sectional image (e.g., first medial slice, third lateral slice, etc.), and information about parameters used to acquire the MRI data (e.g., a distance between the slices, or whether the scan was $T_1$- or $T_2$-weighted). The ANN 300 can thus be trained to produce segmented image data for multiple sectional images and to identify anatomical landmarks in multiple sectional images.

After the ANN 300 has been trained, the computer system 10 can use it to identify anatomical landmarks 46 in image data for patients. The ANN 300 can be trained using imaging data for members of a particular population, for example, the population corresponding to the small knee model 30b. The computer system 10 can input the image data 20 to the trained ANN of the reference model 30b, along with information about, for example, the patient's age, sex, ethnic origin, weight, and height. The ANN 300 can then output data indicating locations of anatomical landmarks 46 and boundaries corresponding to one or more types of tissues.

Identified landmarks 46 identified by the computer system 10 can be used to, for example, determine surgical alignments or determine a location or orientation for an osteotomy. Identified landmarks 46 can also be used to select an implant for a patient. For example, the computer system 10 can select a size or size range for an implant based on the locations of the anatomical landmarks 46 and dimensions determined using the segmented image data 42. The computer system 10 can access data that indicates a range of joint dimensions for which use of various implants is indicated. The computer system 10 can then calculate one or more dimensions using on the segmented image data 42. For example, the computer system can calculate a distance or the orientation of an axis between two identified landmarks 46. The computer system 10 can then compare the calculated dimensions and orientations with the dimension ranges corresponding to various implants. The computer system 10 can select implants or implant sizes indicated for use with the knee, and can present information about the implants or size ranges to a user.

Figure 9:
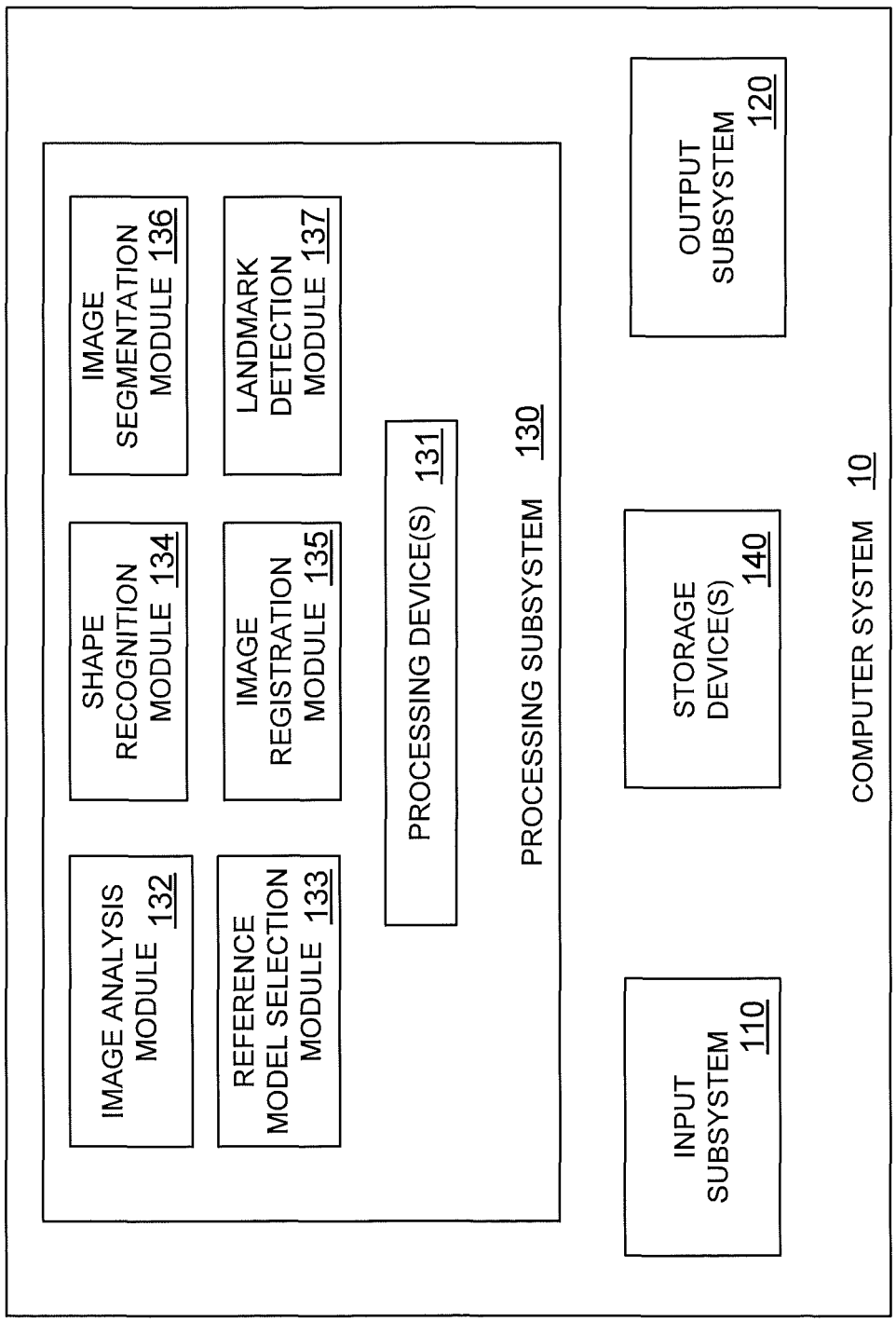
FIG. 9 is a block diagram illustrating components of the computer system.

Referring to FIG. 9, the computer system 10 can include, for example, an input subsystem 110, an output subsystem 120, a processing subsystem 130, and one or more storage devices 140. The computer system 10 can be implemented as a single computing device or as a system of multiple computing devices in communication with each other, for example, over a network. The computer system 10 can be part of a computer aided surgery system.

The input subsystem 110 can include an input interface to receive input image data. The input subsystem 110 can also optionally include, for example, a keyboard, a touchscreen, a pointing device, and other input devices to receive input from a user.

The output subsystem 120 includes an interface to provide segmented image data and data indicating the positions of detected anatomical landmarks. The output subsystem 120 can provide three-dimensional data to a manufacturing system that produces surgical guides or other devices with patient-specific features, for example, surfaces configured to conform to portions of a patient's anatomy.

In some implementations, a digital model produced by the computer system 10 can be used to manufacture surgical guides or other devices that substantially conform to the patient's anatomy. When the segmented image data 42 indicates regions corresponding to both bone and cartilage, the imaging data can be used to manufacture a device that conforms to both bone and cartilage of the patient. Thus in some instances, patient-specific contours may be determined more accurately using the segmented image data 42, which indicates regions corresponding to multiple tissue types, than when using segmented image data indicating regions corresponding to a single tissue type.

The one or more storage devices 140 can include volatile and non-volatile storage, for example, random access memory (RAM), hard disk drives, solid-state disks, CD-ROM disks, and other computer readable media. The one or more storage devices 140 can store instructions that can be executed or interpreted. When executed by one or more processing devices, the instructions cause the computer system 10 to perform the operations described above, including, for example, the operations of the process 200 of FIG. 2.

The processing subsystem 130 includes one or more processing devices that perform the operations described above. The processing subsystem 130 can perform the operations using hardware, software, firmware, or combinations thereof. The processing subsystem 130 can include an image analysis module 132, a reference model selection module 133, a shape recognition module 134, an image registration module 135, an image segmentation module 136, and a landmark detection module 137.

The image analysis module 132 identifies features of imaging data, such as dimensions and shapes of various tissues. The reference module selection module 133 determines whether the identified features are correlated with characteristic attributes of a population and selects a reference model suited for the imaging data. The shape recognition module 134 identifies tissues, such as particular bones, corresponding to particular portions of imaging data.

The image registration module 135 aligns multiple images in a common coordinate reference system, for example, by aligning similar shapes and contours in corresponding locations. The image segmentation module 136 defines boundaries and regions corresponding to different tissues and tissue types. Boundaries of tissues are determined using intensity thresholds, intensity gradient analysis, and constraints indicated by the selected reference model.

The landmark detection module 137 identifies anatomical landmarks in segmented imaging data. The landmark detection module 137 can access data in a reference model to determine a region of interest within an image. The landmark detection module 137 identifies candidate landmarks by for example, identifying local maxima and minima within a region of interest and identifying global maxima and minima for an image. To select anatomical landmarks, the landmark detection module 137 evaluates candidate landmarks against criteria indicated by a reference model.

For example, the candidate landmarks that the reference model indicates as having the highest statistical likelihood of being the correctly located are selected.

Various implementations can include corresponding systems, apparatus, and computer programs, configured to perform the actions of the processes described in this document, encoded on computer storage devices. A system of one or more processing devices or one or more computers or can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

Implementations of the subject matter and the functional operations described in this disclosure can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non-transitory computer readable medium for execution by, or to control the operation of, data processing apparatus.

The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, an operating system, or a combination of one or more of them.

A number of implementations have been described. Nevertheless, it will be understood that various modifications may be made without departing from the spirit and scope of the invention. Accordingly, other implementations are within the scope of the following claims.

What is claimed is:

1. A method comprising:
   accessing image data representing tissue;
   identifying one or more features of the tissue indicated by the image data;
   selecting a model for the tissue based on the one or more identified features;
   segmenting the image data; and
   identifying, using the model, one or more anatomical landmarks of the tissue indicated by the segmented image data;
   wherein the model is selected from a plurality of reference models, each reference model corresponding to a different one of a plurality of different patient populations;
   wherein each of the reference models relates to the corresponding patient population, and includes a set of attributes relating to the corresponding patient population; and
   wherein selecting the model for the tissue based on the one or more identified features includes selecting one of the reference models based on a comparison of the one or more identified features with the set of attributes of each of the plurality of reference models.

2. The method of claim 1, wherein accessing the image data, identifying the one or more features of the tissue, selecting the model, segmenting the image data, and identifying the one or more anatomical landmarks are performed by one or more computing devices.

3. The method of claim 1, wherein identifying one or more features of the tissue based on the image data comprises performing shape recognition on the image data to identify the tissue and orientation of the tissue.

4. The method of claim 1, wherein identifying the one or more features of the tissue based on the image data comprises:
   segmenting the image data to produce initial segmented image data;
   identifying one or more features of the tissue based on the initial segmented image data; and
   identifying the one or more features as correlated with a particular medical condition or deformity.

5. The method of claim 1, wherein each of the patient populations relates to at least one of a medical condition, medical deformity, size, age, and sex, and wherein selecting the model for the tissue based on the one or more identified features comprises:
   determining that the one or more identified features are correlated with a particular medical condition, medical deformity, size, age, or sex based on the comparison of the one or more identified features with the set of attributes of each of the plurality of reference models; and
   based on determining that the one or more identified features are correlated with the particular medical condition, medical deformity, size, age, or sex, selecting one of the patient populations related to the particular medical condition, medical deformity, size, age, or sex, and selecting the reference model corresponding to the selected patient population.

6. The method of claim 1, wherein segmenting the image data comprises applying one or more thresholds to the image data to define a plurality of boundaries in the image data.

7. The method of claim 6, wherein applying one or more thresholds comprises applying one or more intensity or contrast thresholds.

8. The method of claim 1, further comprising:
   identifying a region of the segmented image data containing an error in a segmented boundary corresponding to a predetermined anatomical feature; and
   correcting the segmented boundary based on the model to produce corrected segmented image data;
   wherein identifying one or more anatomical landmarks in the segmented image data using the model comprises identifying one or more anatomical landmarks in the corrected segmented image data using the model.

9. The method of claim 1, wherein selecting the model for the tissue based on the one or more identified features comprises selecting a model that includes an artificial neural network trained to identify locations of one or more anatomical landmarks.

10. The method of claim 9, wherein the artificial neural network is trained to identify locations of one or more anatomical landmarks for a population of patients determined based on a medical condition or deformity, size, age, or sex.

11. The method of claim 9, wherein segmenting the image data comprises using the artificial neural network to determine boundaries corresponding to one or more tissues.

12. The method of claim 1, wherein identifying one or more anatomical landmarks in the segmented image data using the model comprises identifying features corresponding to particular pre-determined anatomical landmarks indicated by the model.

13. The method of claim 1, wherein identifying one or more anatomical landmarks in the segmented image data using the model comprises identifying one or more global maximum or minimum locations of the segmented image data.

14. The method of claim 1, further comprising determining that a region of the image data is likely to include a particular anatomical landmark based on the one or more identified features; and wherein identifying one or more anatomical landmarks in the segmented image data using the model comprises identifying, as the particular anatomical landmark, a local maximum or local minimum in a region of the segmented image data corresponding to the region.

15. The method of claim 1, further comprising identifying a plurality of candidate landmarks within the segmented image data;
wherein the image data is representative of tissue in an anatomical location;
wherein each of the models further comprises a template representative of the anatomical location for the corresponding patient population, each template including one or more reference landmarks; and
wherein identifying the one or more anatomical landmarks includes identifying the one or more anatomical landmarks based on a comparison of the plurality of candidate landmarks with the one or more reference landmarks of the template of the selected one of the reference models.

16. The method of claim 15, wherein each of the reference models further includes statistical confidence levels indicating likely variances in position of the one or more reference landmarks of the template of the reference model; and
wherein the comparison of the plurality of candidate landmarks with the one or more reference landmarks includes a comparison of the plurality of candidate landmarks with the statistical confidence levels of the selected one of the reference models.

17. The method of claim 1, wherein selecting one of the reference models based on a comparison of the one or more identified features with the set of attributes of each of the plurality of reference models includes determining which of the plurality of different patient populations corresponds to the image data based on the comparison of the one or more identified features with the set of attributes of each of the plurality of reference models, and selecting the reference model corresponding to the determined patient population.

18. A method comprising:
accessing image data representing tissue;
identifying one or more features of the tissue indicated by the image data;
selecting a model for the tissue based on the one or more identified features;
segmenting the image data; and
identifying, using the model, one or more anatomical landmarks of the tissue indicated by the segmented image data;
wherein identifying one or more anatomical landmarks in the segmented image data using the model comprises:
identifying slices of the image data corresponding to a region of interest;
selecting one of the slices that has the highest contrast for the region of interest; and
identifying the one or more anatomical landmarks based on the segmented image data corresponding to the selected slice.

* * * * *